No. 621,822. Patented Mar. 28, 1899.
E. P. KENDALL.
ROTARY ENGINE.
(Application filed Mar. 31, 1898.)

(No Model.)

Witnesses  Elton P. Kendall. Inventor
By his Attorneys,

UNITED STATES PATENT OFFICE.

ELTON P. KENDALL, OF FAIRLEE, VERMONT, ASSIGNOR OF TWO-THIRDS TO GEORGE A. DICKEY, OF BRADFORD, AND CHARLES F. SMITH, OF TOPSHAM, VERMONT.

ROTARY ENGINE.

SPECIFICATION forming part of Letters Patent No. 621,822, dated March 28, 1899.

Application filed March 31, 1898. Serial No. 675,954. (No model.)

*To all whom it may concern:*

Be it known that I, ELTON P. KENDALL, a citizen of the United States, residing at Fairlee, in the county of Orange and State of Vermont, have invented a new and useful Rotary Engine, of which the following is a specification.

My invention relates to rotary engines of the concentric-piston type, and has for its object to provide a simple, compact, and efficient construction and arrangement of valves and pressure-controlling devices whereby the supply of motive agent is diminished as the operating piston-wing recedes from the fixed abutment, and also to provide such a construction and arrangement of parts as to provide for the use of either one or more piston-wings, as may be preferred, to suit the conditions under which the mechanism is to be operated.

Further objects and advantages of this invention will appear in the following description, and the novel features thereof will be particularly pointed out in the appended claims.

Figure 2:
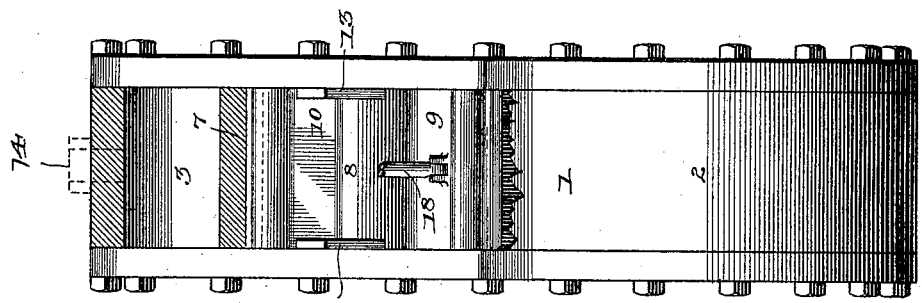
Figure 1:
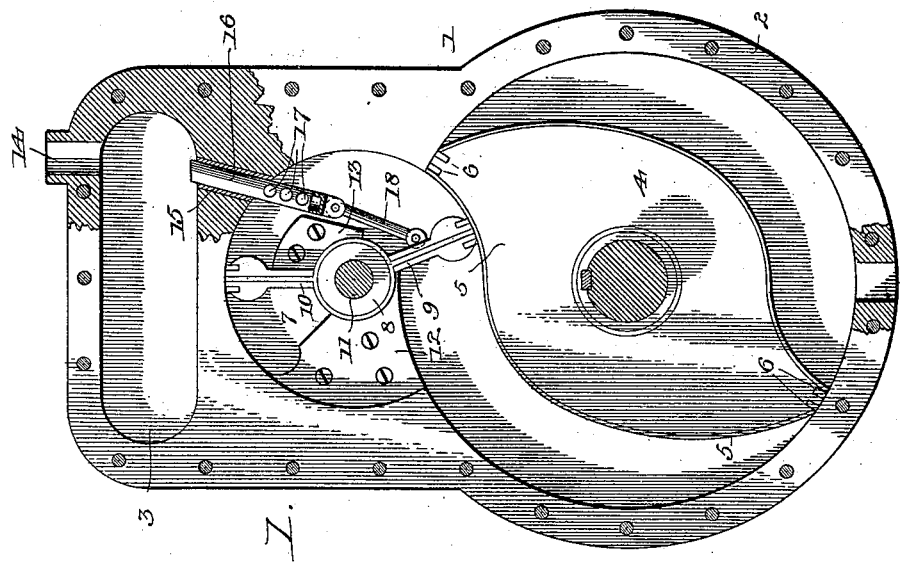

In the drawings, Figure 1 is a central sectional view taken in a plane transverse to the piston-axis of an engine constructed in accordance with my invention. Fig. 2 is a side view showing the steam-chest and valve mechanism in section on a plane parallel with the spindle of the balanced abutment.

Similar numerals of reference indicate corresponding parts in both figures of the drawings.

In a casing 1, having a cylinder portion and a steam-chest 3, is mounted a concentric rotary piston 4, of which a wing or wings 5 may be so fitted with packing-strips 6 as to form a steam-tight bearing against the inner surface of the cylinder. Communicating with the cylinder is a cavity 7, forming an abutment-seat, and mounted for oscillatory movement in said seat is a balanced or double-winged abutment 8, having an operating or pressure wing 9 and a balancing-wing 10, extending in approximately opposite directions from the spindle 11 and of approximately equal areas. These abutment-wings are also provided with packing-strips 6ª to bear against the wall of the seat, and in the path of the balancing-wing 10 are arranged spaced stops 12 and 13 to respectively check the movement of the abutment at the limits of its oscillation. The steam-chest 3 is provided with an inlet or supply port 14, and connecting the steam-chest with an abutment-seat is a feed-port 15, also forming a seat for a slide or reciprocatory valve 16. This reciprocatory valve performs the function of a throttle in that being hollow or tubular it is provided with a plurality of spaced feed-ports 17, which are adapted to be successively closed as the valve is moved from its normal or extended position (shown in full lines in Fig. 1) to its retracted position, (indicated in dotted lines in the same figure,) the closing of said ports 17 being accomplished by the sliding of the valve into the seat 15. Connection is made between the inner end of the slide-valve and the operative or pressure wing of the abutment by means of a link 18, and the inner end of the bore of the slide-valve is closed to form a head adapted to receive the pressure of motive agent entering the abutment-seat from the steam-chest.

Inasmuch as the abutment is balanced, it will be seen that the pressure of motive agent in the abutment-seat, admitted through the port 17, will not materially affect the contact of the edge of the operative wing 9 with the surface of the piston 4, and hence as the piston-wings successively approach the operative wing of the abutment they will serve to swing the abutment to its inoperative position (indicated in dotted lines in Fig. 1) in order that said wings may pass without encountering any material obstacle to the rotary movement of the piston; but in order that the abutment may be returned promptly to its operative position after a piston-wing has passed the extremity thereof I depend upon the fluid-pressure applied to the closed inner end or head of the tubular slide-valve 16. Thus as the piston rotates its wing or wings periodically displace the abutment by folding it into the abutment-seat, and after the piston-wing has passed the abutment the latter is returned to its operative position in order to allow the application of motive agent to said wing of the piston by the continuous pressure which is applied from the steam-chest to the closed inner end or head of the slide-valve.

It is desirable in mechanism of this class to provide means whereby the supply of the motive agent when of an expansible quality may be diminished as the piston-wing which is receiving the pressure recedes from the point of supply, and in order to accomplish this I construct the surface of the piston with a gradual cam-face extending from a point $a$ (see Fig. 1) to the crown or most remote point $b$ of the piston-wing. Hence when the point $a$ reaches the abutment-wing the latter begins to move gradually toward its abnormal position, and thus the spaced feed-ports 17 are successively advanced into the seat 15 and are closed, whereby the steam or other motive agent enters the abutment-seat through a gradually-reduced feed-port. This reduction of the inflow of motive agent continues until, the piston-wing having reached a point in the plane of the operative wing 9 of the abutment, the inlet of steam is entirely cut off. In the same way after the piston-wing has passed the abutment-wing the application of the motive agent is made gradually in that the feed-ports 17 are successively exposed.

The engine which I have illustrated in the drawings is provided with a piston having two wings; but, as above indicated, the number of wings may be varied, and also a duplication of the valve and abutment mechanism may be provided to adapt the structure for imparting rotary motion in either direction to the piston, and in the same way a plurality of pistons and valve mechanisms may be arranged in series in the same casing to form either a double, triple, or quadruple engine; but I have deemed it unnecessary, in view of the fact that such changes would involve mere duplication, to illustrate the same in the drawings. Also various other changes in the form, proportion, and the minor details of construction may be resorted to without departing from the spirit or sacrificing any of the advantages of this invention.

Having described my invention, what I claim is—

1. In a rotary engine, the combination of a casing having a cylinder and a communicating abutment-seat, a winged piston mounted in the cylinder, an oscillatory balanced abutment mounted in said abutment-seat and having a wing arranged in operative relation with the piston, and in the path of the piston-wing for displacement thereby, and yielding abutment-operating means for extending the abutment-wing after each displacement by a piston-wing, and controlling cylinder feed-ports through which motive agent is admitted to the abutment-seat in advance of the operative abutment-wing, substantially as specified.

2. In a rotary engine, the combination of a cylinder and a communicating abutment-seat, a winged piston mounted in the cylinder, an oscillatory abutment having oppositely-located operative and balancing wings of approximately equal areas, the operative abutment-wing being arranged in the path of the piston-wings for displacement thereby, and a reciprocatory abutment-operating member exposed to a constant yielding pressure, for extending and maintaining the operative wing in its normal position and controlling cylinder feed-ports, substantially as specified.

3. In a rotary engine, the combination with a cylinder and a communicating abutment-seat, of a winged piston arranged in the cylinder, an oscillatory winged abutment arranged in the abutment-seat and having approximately coextensive operative and balancing wings simultaneously exposed to fluid-pressure, the operative abutment-wing being arranged in the path of the piston-wings for displacement thereby, and a slide-valve permanently exposed to fluid-pressure connected with the oscillatory abutment for normally maintaining the same in its operative position and controlling cylinder feed-ports, substantially as specified.

4. In a rotary engine, the combination with a cylinder and a communicating abutment-seat, of a winged piston arranged in the cylinder, an oscillatory winged abutment arranged in the abutment-seat and having approximately coextensive operative and balancing wings simultaneously exposed to fluid-pressure, the operative abutment-wing being arranged in the path of the piston-wings for displacement thereby, and a hollow slide-valve connected with the abutment and fitted in an inlet-port for the communication of motive agent to the abutment-seat, said slide-valve having a lateral feed-port for closure by the axial movement of the valve, substantially as specified.

5. In a rotary engine, the combination with a cylinder and a communicating abutment-seat, of a winged piston arranged in the cylinder, an oscillatory winged abutment arranged in the abutment-seat and having approximately coextensive operative and balancing wings simultaneously exposed to fluid-pressure, the operative abutment-wing being arranged in the path of the piston-wings for displacement thereby, and a hollow slide-valve fitted in an an inlet-port and connected with the abutment, said valve having a head exposed to the constant pressure of motive agent admitted through the inlet-port, and provided with a lateral feed-port for closure by the walls of the inlet-port when the valve is moved axially, substantially as specified.

6. In a rotary engine, the combination with a cylinder and a communicating abutment-seat, of a winged piston arranged in the cylinder, an oscillatory winged abutment arranged in the abutment-seat and having approximately coextensive operative and balancing wings simultaneously exposed to fluid-pressure, the operative abutment-wing being arranged in the path of the piston-wings for displacement thereby, and a hollow slide-valve fitted in an inlet-port in communication with said abutment-seat and flexibly connected with the abutment, said slide-valve having a head permanently exposed to the constant pressure of motive agent admitted through the inlet-port and provided with a longitudinal series of feed-ports, for successive closure by the walls of the inlet-port as the valve is moved axially, substantially as specified.

7. In a rotary engine, the combination of a casing having a cylinder, a communicating abutment-seat, and an inlet-port in communication with the abutment-seat, a winged rotary piston mounted in the cylinder, a winged abutment mounted for oscillation in the abutment-seat and having oppositely-extending approximately coextensive wings, of which one is arranged in operative relation with the piston, a hollow slide-valve fitted in said inlet-port and provided with a plurality of feed-ports arranged in a longitudinal series, for successive closure and exposure by the opposite reciprocatory movements of the valve, and connections between the abutment and said valve, substantially as specified.

8. In a rotary engine, the combination with a casing having a cylinder and a communicating abutment-seat, a winged piston mounted in the cylinder, a winged abutment mounted in the abutment-seat, and a feed-valve operatively connected with the abutment and having a plurality of spaced feed-ports arranged parallel with the direction of movement of the valve, said feed-ports being adapted for successive closure and exposure during movements of the valve in opposite directions, the piston having a gradual cam-face for actuating the abutment to impart movement to the feed-valve, substantially as specified.

9. In a rotary engine, the combination of a casing having a cylinder and a communicating abutment-seat, and also having an inlet-port communicating with the abutment-seat, a winged piston mounted in the cylinder, an oscillatory abutment mounted in the abutment-seat and having oppositely-disposed operative and balancing wings, fixed stops arranged in the path of the balancing-wing to limit the oscillatory movement of the abutment, a hollow feed-valve fitted for reciprocatory movement in the said inlet-port and provided with a closed inner end or head and lateral feed-ports adapted to be inclosed within the inlet-port when the valve is retracted, and connections between the abutment and the feed-valve, substantially as specified.

In testimony that I claim the foregoing as my own I have hereto affixed my signature in the presence of two witnesses.

ELTON P. KENDALL.

Witnesses:
F. A. MESSER,
ALMA K. MESSER.